(12) United States Patent
Kimoto et al.

(10) Patent No.: US 9,335,992 B2
(45) Date of Patent: May 10, 2016

(54) SAFE UNLOCKING MACHINE

(71) Applicant: LECIP HOLDINGS CORPORATION, Gifu-ken (JP)

(72) Inventors: Kenji Kimoto, Motosu (JP); Takeshi Matsuno, Motosu (JP); Yasuhiro Suzuki, Motosu (JP)

(73) Assignee: Lecip Holdings Corporation, Gifu-Ken (JP)

( * ) Notice: Subject to any disclaimer, the term of this patent is extended or adjusted under 35 U.S.C. 154(b) by 0 days.

(21) Appl. No.: 14/648,330

(22) PCT Filed: Nov. 29, 2013

(86) PCT No.: PCT/JP2013/082181
§ 371 (c)(1),
(2) Date: May 29, 2015

(87) PCT Pub. No.: WO2014/087930
PCT Pub. Date: Jun. 12, 2014

(65) Prior Publication Data
US 2015/0302681 A1    Oct. 22, 2015

(30) Foreign Application Priority Data

Dec. 5, 2012 (JP) .................................. 2012-266528

(51) Int. Cl.
*G07F 9/06* (2006.01)
*G06F 9/06* (2006.01)
*G07D 11/00* (2006.01)

(52) U.S. Cl.
CPC .............. *G06F 9/06* (2013.01); *G07D 11/0009* (2013.01)

(58) Field of Classification Search
CPC .......... G07D 11/0009; G07D 11/0036; G07D 11/0081; G07D 11/0048; G07F 9/06; E05B 65/0075; E05G 1/02; E05G 1/04; E05G 7/00; B65H 2701/1912
USPC ........... 232/15, 16, 1 D, 44, 43.2; 109/55, 47, 109/24.1; 194/350, 351
See application file for complete search history.

(56) References Cited

U.S. PATENT DOCUMENTS

| 4,380,316 | A | * | 4/1983 | Glinka | ............... G07D 11/0009 |
| | | | | | 109/55 |
| 4,648,327 | A | * | 3/1987 | Toth | ........................ E05G 1/005 |
| | | | | | 109/55 |
| 7,694,872 | B2 | | 4/2010 | Noll et al. | |

(Continued)

FOREIGN PATENT DOCUMENTS

| JP | 56-118477 | 9/1981 |
| JP | 09-128586 | 5/1997 |

(Continued)

OTHER PUBLICATIONS

International Search Report of PCT/JP2013/082181 dated Feb. 18, 2014.
International Preliminary Report on Patentability for PCT/JP2013/082181 issued Jun. 9, 2015.

*Primary Examiner* — William Miller
(74) *Attorney, Agent, or Firm* — Caesar Rivise, PC

(57) ABSTRACT

A safe unlocking machine is provided with: an operation direction switching mechanism for selectively switching between a first direction allowance state in which only the operation of an operation unit in the first direction is allowed, and a second direction allowance state in which only the operation of the operation unit in the second direction is allowed; detectors for detecting the action of the safe unlocking machine and generating a detection signal; and a switching controller for controlling an operation direction switching mechanism on the basis of the detection signal from the detectors and thereby selectively setting the direction of movement of the operation unit to the first direction or the second direction.

6 Claims, 10 Drawing Sheets

(56) References Cited

U.S. PATENT DOCUMENTS

2014/0096709 A1* 4/2014 McGunn ............ G07D 11/0009 109/52
2015/0170450 A1* 6/2015 Kimoto .................... E05G 1/02 700/225

FOREIGN PATENT DOCUMENTS

| JP | 2003-263665 | 9/2003 | | |
|---|---|---|---|---|
| JP | 2011-221918 | 4/2011 | | |
| WO | WO 2014007214 A1 * | 1/2014 | ................ | E05G 1/02 |

* cited by examiner

SAFE UNLOCKING MACHINE

CROSS REFERENCE TO RELATED APPLICATIONS

This U.S. national phase application claims the benefit under 35 U.S.C. §371 of PCT Application No. PCT/JP2013/082181 filed on Nov. 29, 2013, which in turn claims the benefit under Japanese Application Serial No 2012-266528 filed on Dec. 5, 2012 and all of whose entire disclosures are incorporated by reference herein.

FIELD OF INVENTION

The present invention relates to a safe unlocking machine that obtains currency from safes and collects the currency at a single location.

BACKGROUND OF THE INVENTION

A safe unlocking machine that collects, at a single location, items (currency or the like) from farebox safes (see Patent Document 1) is known in the art. After running a route, a driver removes the safe from the farebox and carries the removed safe to a commuter vehicle terminal or the like. The safe removed from the farebox body has an opening that is closed by a safe door for security. The safe door is locked when the opening of the safe is closed.

When collecting currency from the safe with a safe unlocking machine, the safe is, for example, set upside side down on the safe unlocking machine. The safe door is unlocked with a key provided in the safe unlocking machine. When collection starting conditions are satisfied for the safe unlocking machine, a handle of the safe unlocking machine becomes operable. A single rotation of the handle moves only a safe body from a home position, which is the set position, to an inner retraction position, while the safe door remains at the same position. The currency and the like fall out of the safe body from the opening. This collects the currency from the safe in the container of the safe unlocking machine. This collecting operation is performed for each safe so that the safe unlocking machine collects, at a single location, currency from each safe.

The following constitutes a prior art document:
Patent Document 1: Japanese Laid-Open Patent Publication No. 9-128586

All references cited and/or identified are specifically incorporated by reference herein

SUMMARY OF INVENTION

In the present safe unlocking machine, for example, a return mechanism such as a spring returns the safe body from the retraction position to the original home position after a certain time elapses from when the safe body reaches the retraction position. It is therefore necessary to provide the safe unlocking machine with a complicated spring for returning the safe body from the retraction position to the home position, which is where the safe body was located before operation of the handle. Thus, the safe unlocking machine has a complicated structure.

It is an object of the present invention to provide a safe unlocking machine that allows for a simplified structure.

One aspect of the present invention is a safe unlocking machine. The safe unlocking machine collects items accommodated in a safe body of a safe by setting the safe, unlocking the safe, and opening a lid of the safe. The safe unlocking machine moves the safe body of the safe between a first position where the lid closes the safe and a second position where the lid opens the safe. The safe unlocking machine includes an operation unit operable to move in a first direction when moving the safe body from the first position to the second position and to move in a second direction, which is opposite to the first direction, when moving the safe body from the second position to the first position. An operation direction switching mechanism that selectively switches to a first movement permitting condition in which movement of the operation unit is permitted only in the first direction and a second movement permitting condition in which movement of the operation unit is permitted only in the second direction. A detector detects operation of the safe unlocking machine and generates a detection signal. A switch controller that controls the operation direction switching mechanism based on a detection signal from the detector to selectively set a movement direction of the operation unit to the first direction and the second direction.

In the above structure, the safe unlocking machine includes a safe accommodation portion capable of setting the safe and including a door. The switch controller sets the operation direction switching mechanism to the first movement permitting condition, when the safe is set in the safe accommodation portion and the door of the safe accommodation portion is closed and locked. The switch controller sets the operation direction switching mechanism to the second movement permitting condition, when the safe body of the safe set in the safe accommodation portion moves from the first position to the second position.

In the above structure, the safe unlocking machine includes an operation unit lock mechanism that includes a projection that moves in cooperation with the door and a receptacle that moves in cooperation with the operation unit. The operation unit lock mechanism restricts movement of the operation unit when the door of the safe accommodation portion is open and the projection is engaged with the receptacle. The operation unit lock mechanism allows movement of the operation unit by closing the door of the safe accommodation portion to separate the projection from the receptacle.

In the above structure, the switch controller switches the operation direction switching mechanism from the first movement permitting condition to the second movement permitting condition when the safe body does not move from the first position to the second position within a predetermined time. The switch controller switches the operation direction switching mechanism from the second movement permitting condition to the first movement permitting condition when the safe body does not move from the second position to the first position within a predetermined time.

In the above structure, the safe unlocking machine includes a first detection sensor that detects when the safe body is located at the first position and supplies a first detection signal to the switch controller and a second detection sensor that detects when the safe body is located at the second position and supplies a second detection signal to the switch controller. The switch controller determines whether the safe body has moved between the first position and the second position within a predetermined time based on the first detection signal and the second detection signal.

In the above structure, when the operation unit does not receive the second detection signal before a predetermined time elapses from when the operation unit moves in the first direction, the switch controller determines that the safe body has not moved from the first position to the second position within the predetermined time and switches the operation direction switching mechanism from the first movement permitting condition to the second movement permitting condition. When the operation unit does not receive the first detection signal before a predetermined time elapses from when the operation unit moves in the second direction, the switch controller determines that the safe body has not moved from the second position to the first position within the predetermined time and switches the operation direction switching mechanism from the second movement permitting condition to the first movement permitting condition.

According to the present invention, it is possible to simplify the structure of a safe unlocking machine.

DETAILED DESCRIPTION OF THE PREFERRED EMBODIMENT

One embodiment of a safe unlocking machine will now be described with reference to FIGS. 1 to 12.

Figure 1:
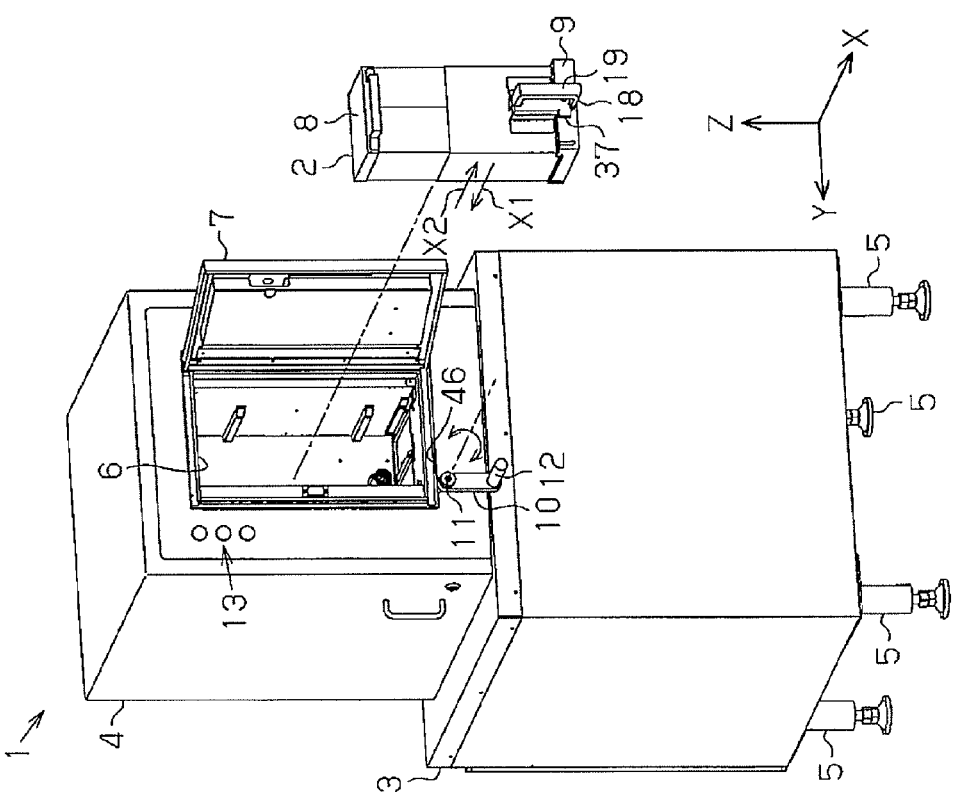
FIG. 1 is a perspective view showing the front side of one embodiment of a safe unlocking machine.

Referring to FIG. 1, a safe unlocking machine 1 is a machine that collects, at a single location, currency (coins/bills) and tickets from a plurality of safes 2 respectively removed from a plurality of fareboxes (not shown). The safe unlocking machine 1 includes a cabinet 3, which functions as a location for collecting items, and a receiver 4, which is arranged on the cabinet 3 and to which the safe 2 is set. The cabinet 3 is larger in size than the receiver 4. For example, the cabinet 3 is box-shaped and supported by four legs 5. The receiver 4 includes a safe accommodation portion 6, which is located at the front of the receiver 4, and a receiver door 7, which has a lock (not shown) and which opens and closes the safe accommodation portion 6. The safe 2 is set in the safe accommodation portion 6. The safe 2 includes a safe body 8, which accommodates currency and the like, and a safe lid 9, which closes an opening of the safe body 8. When the safe 2 is set in the safe accommodation portion 6, the safe body 8 is located at the upper side of the safe lid 9. The receiver door 7 is one example of a safe storage door.

A rotatable receiver handle 10 is arranged on the front surface of the receiver 4. When the safe 2 is set in the safe accommodation portion 6, rotation of the receiver handle 10 moves only the safe body 8 in the rearward direction (X-axis direction in FIG. 1) of the machine, while the safe lid 9 remains at the same location. A handle knob 12 of the receiver handle 10 can be rotated once (by 360 degrees) around a handle shaft 11 from a home position. The home position of the receiver handle 10 refers to the rotation position where the handle knob 12 is located at the lowermost position. In this example, the receiver handle 10 is used when moving the safe body 8 in the rearward direction (arrow X1 direction in FIG. 1) and when moving the safe body 8 in the frontward direction (arrow X2 direction in FIG. 1). The receiver handle 10 is one example of an operation unit.

The front surface of the receiver 4 includes an indicator 13, which indicates the operating state of the safe unlocking machine 1. The indicator 13 includes, for example, a plurality of LEDs so that an operator may recognize, for example, a normal condition, currency retrieval, an operation error, or the like.

Figure 2:
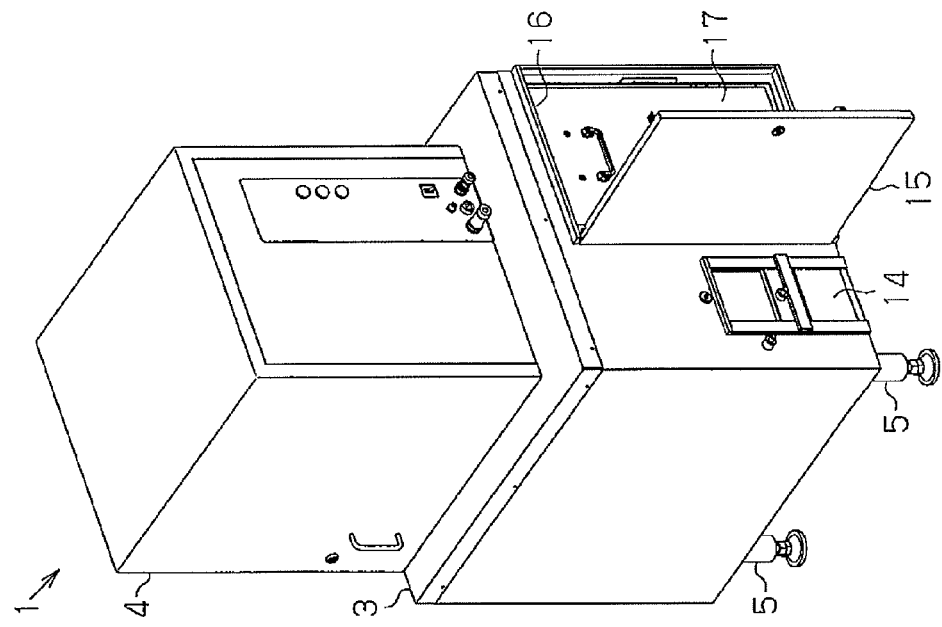
FIG. 2 is a perspective view showing the back side of the safe unlocking machine.

As shown in FIG. 2, the rear surface of the cabinet 3 includes a discharge door 14 for coins, which are accommodated in the cabinet 3. The rear surface of the cabinet 3 also includes a rear door 15, which opens sideward. The rear door 15 closes a container accommodation portion 16 of the cabinet 3. The accommodation portion 16 accommodates a container 17, which accommodates currency and the like. The container 17 may be drawn out of the container accommodation portion 16.

Figure 3A:
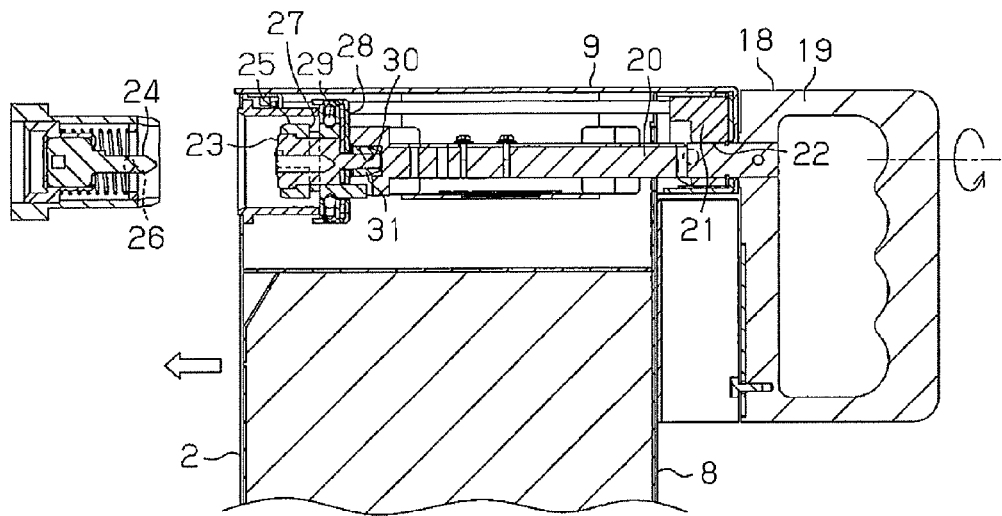
FIG. 3A is a cross-sectional view showing a lock-incorporated safe when the safe is locked.
Figure 3B:
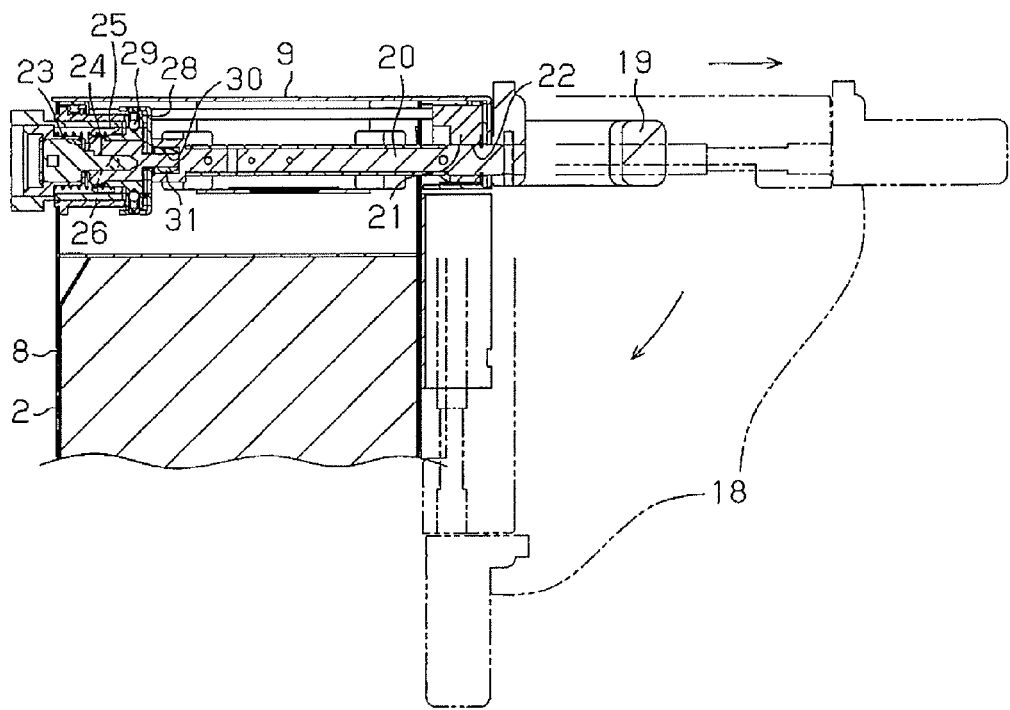
FIG. 3B is a cross-sectional view showing the lock-incorporated safe when the safe is unlocked.

As shown in FIGS. 3A and 3B, the safe lid 9 includes a safe handle 18, which is operated when opening and closing the safe lid 9. The safe handle 18 includes a grip 19 and a shaft 20. The shaft 20 is movably inserted into a block 21 of the safe body 8. The block 21 includes a bearing 22 that supports the safe handle 18 so that the safe handle 18 is rotatable around the shaft 20. Further, the bearing 22 of the block 21 supports the safe handle 18 to be movable. When the safe lid 9 is fully drawn out, the block 21 is rotatable together with the safe lid 9 and the safe handle 18 about an axis orthogonal to the direction of the safe lid 9.

The rear surface of the safe body 8 includes a cylinder lock 23, which functions as a lock of the safe lid 9. A rotational piece 25, which rotates integrally with the cylinder lock 23 when an authorized key plate 24 is inserted into the cylinder lock 23, is arranged on the outer circumference of the cylinder lock 23. The outer circumference of the rotational piece 25 includes an engagement groove 27, which is engageable with a projection 26 of the key plate 24. The rotational piece 25 produces clicks with two clicking portions 29, which are arranged on a substantially ring-shaped support frame 28. When the safe lid 9 is moved in a closing direction and closed, a shaft engagement portion 31 of the cylinder lock 23 moves into and engages an engagement recess 30 in a distal end of the shaft 20 and so that the shaft 20 and the cylinder lock 23 become integrally rotatable.

Referring to FIG. 3A, rotation of the cylinder lock 23 is disabled when the safe lid 9 is closed by arranging the safe handle 18 at the vertical position and moving the safe handle 18 to the innermost position under a situation in which the key plate 24 is not inserted into the cylinder lock 23. The safe handle 18 is fixed to the safe body 8 in the vertical position, that is, the safe lid 9 is locked. Therefore, when carrying the safe 2, the safe lid 9 is closed and locked so that another person will not be able to open the safe lid 9.

Referring to FIG. 3B, unlocking of the cylinder lock 23 is enabled when the safe 2 is set to, for example, a farebox or the safe unlocking machine 1 and the key plate 24 is inserted into the cylinder lock 23. This allows rotation of the cylinder lock 23 and the rotational piece 25, that is, the safe handle 18. The safe handle 18 is pulled from the fixed position and rotated by approximately 90 degrees to a horizontal position to open the safe lid 9. When the safe 2 is fully drawn out, the safe lid 9 is rotatable with the block 21 and may be pushed down by 90 degrees from the horizontal position. When the safe handle 18 is rotated to the unlocking side, the projection 26 is caught in the engagement groove 27 to fix the safe 2 to a farebox or the safe unlocking machine 1.

Figure 4:
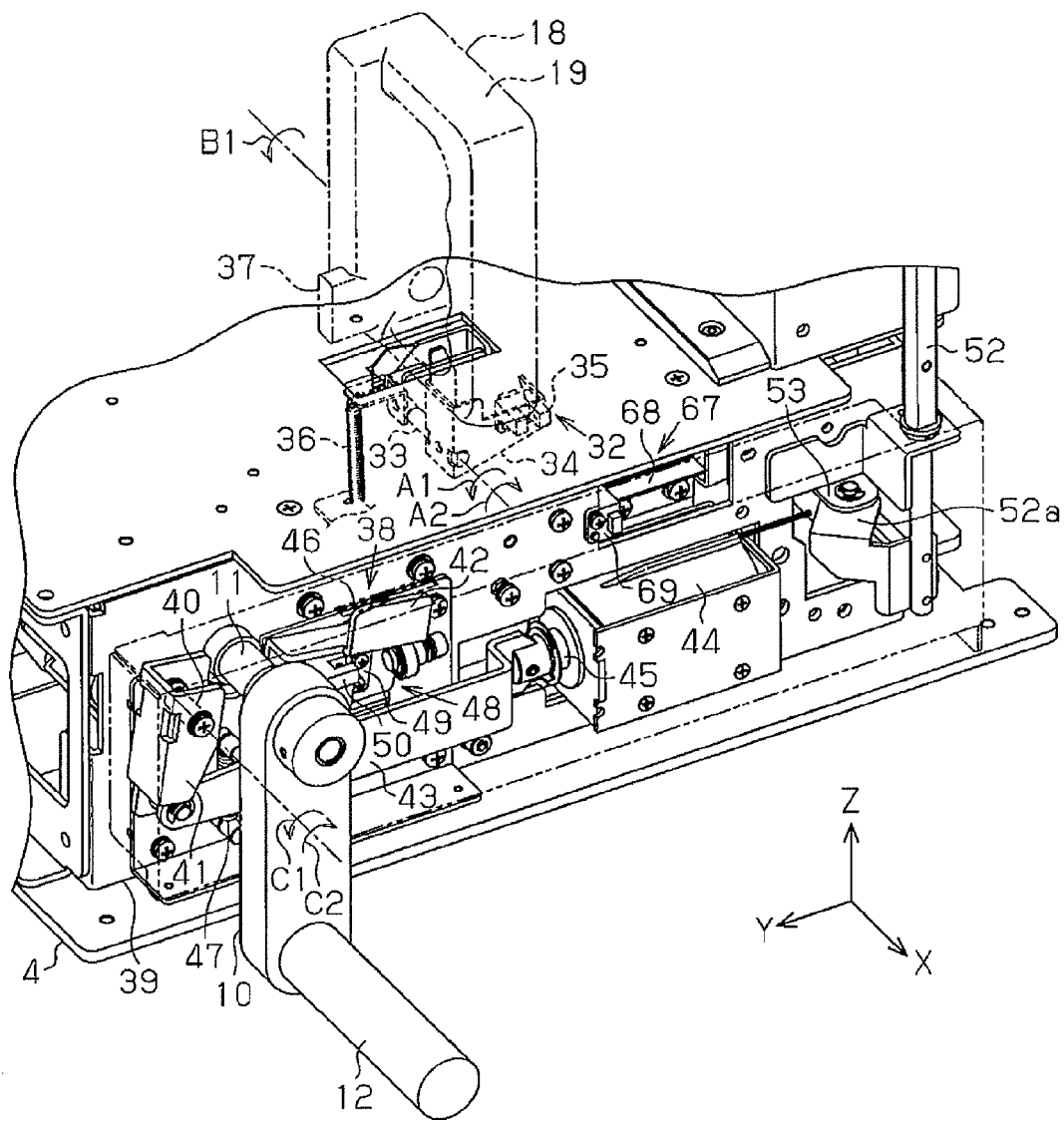
FIG. 4 is a perspective view showing the structure near a receiver handle.

As shown in FIG. 4, the bottom of the safe accommodation portion 6 includes a safe detection sensor 32, which detects whether the safe 2 is set in the safe accommodation portion 6. The safe detection sensor 32 includes, for example, a photo-coupler (optical sensor). The safe detection sensor 32 includes a lever 34, which is rotatable around a rotational shaft 33, a sensor 35, which detects whether or not the lever 34 is blocking light, and a biasing portion 36, which biases the lever 34 in an opening direction (direction of arrow A2 in FIG. 4). If the safe handle 18 is rotated by approximately 90 degrees in an unlocking direction (direction of arrow B1 in FIG. 4) when the safe 2 is set in the safe accommodation portion 6, a projection 37, which is located at the bottom of the safe handle 18, rotates the lever 34 in a pushing direction (direction of arrow A1 in FIG. 4) against a biasing force of the biasing portion 36. This activates the safe detection sensor 32. The safe detection sensor 32 is one example of a detection sensor.

Figure 5A:
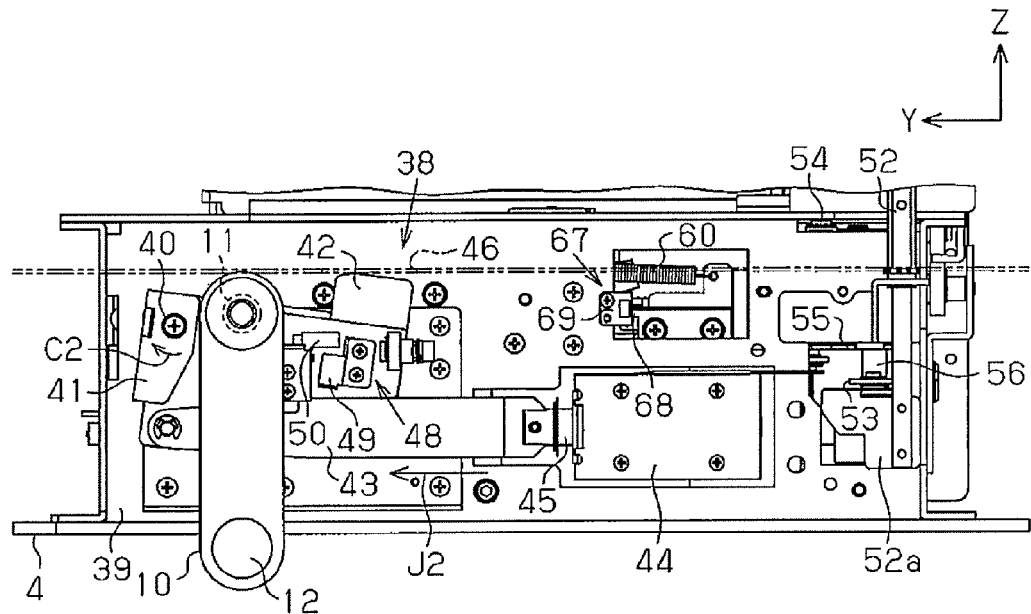
FIG. 5A is a front view showing an operating state of a receiver door lock mechanism when the safe is unlocked.
Figure 5B:
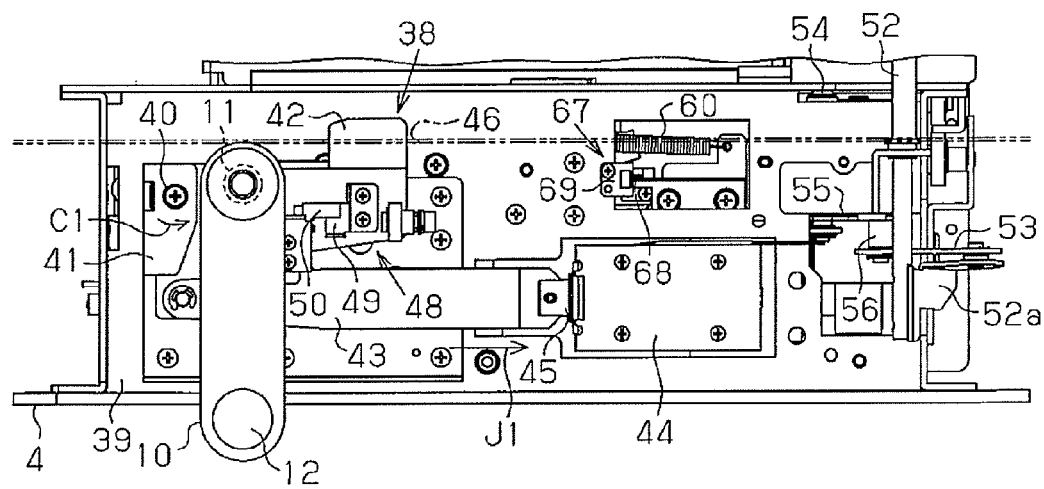
FIG. 5B is a front view showing an operating state of the receiver door lock mechanism when the safe is locked.

As shown in FIGS. 4, 5A and 5B, the receiver 4 includes a receiver door lock mechanism 38, which is capable of locking the closed receiver door 7. A frame 39 of the receiver 4 includes a lever 41, which is rotatable around a rotational shaft 40 extending in the inward direction (X-axis direction in FIG. 4). A projection 42, which is engaged with the receiver door 7, projects from the upper end of the lever 41. The basal end of the lever 41 pivotally supports one end of a connection portion 43, which is an elongated plate. The other end of the connection portion 43 is pivotally supported by a plunger 45 of a solenoid 44. The solenoid 44 includes, for example, a retractable solenoid. The solenoid 44 serves as a drive source when rotating the lever 41 in a locking direction (arrow C1 direction of FIG. 4). The projection 42 is exposed to the outside from a slit 46 in the upper wall of the frame 39 when the lever 41 is rotated in a locking direction. A biasing portion 47, which biases the lever 41 in an unlocking direction (arrow C2 direction of FIG. 4), is located between the frame 39 and the lever 41.

The receiver door lock mechanism 38 includes a receiver door locking detection sensor 48, which detects whether the receiver door lock mechanism 38 is locked or unlocked. The receiver door locking detection sensor 48 includes, for example, a photocoupler. The receiver door locking detection sensor 48 includes a light-blocking plate 49, which projects from a distal end of the lever 41, and a sensor 50, which detects whether or not light is blocked by the light-blocking plate 49. When the solenoid 44 is activated and the lever 41 is pivoted to a lock position, the light-blocking plate 49 blocks the light of the sensor 50. This activates the receiver door locking detection sensor 48. The receiver door locking detection sensor 48 is one example of a detection sensor.

Figure 6:
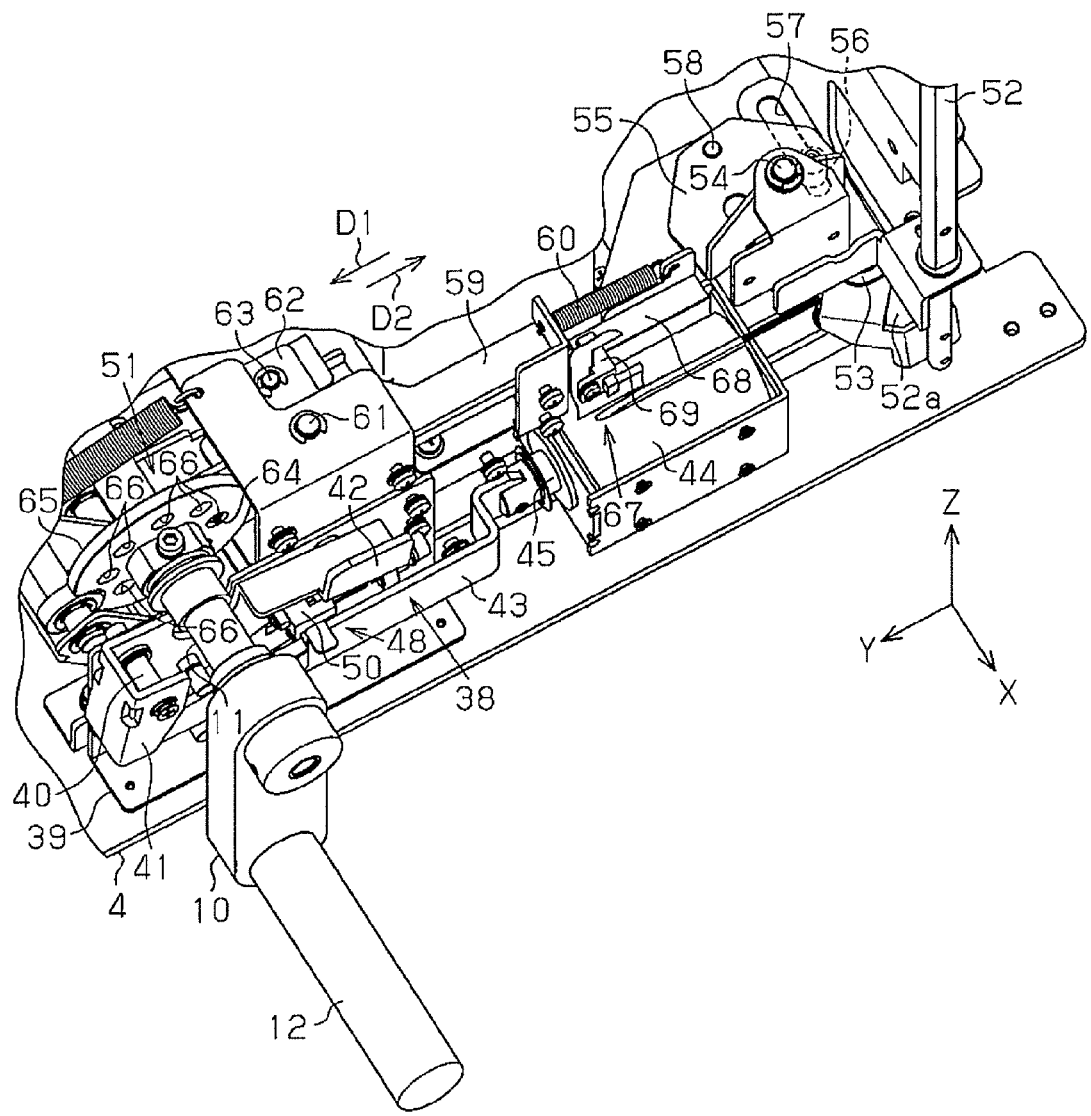
FIG. 6 is a perspective view showing the structure of a receiver handle lock mechanism.

As shown in FIG. 6, the receiver 4 includes a receiver handle lock mechanism 51, which disables rotation of the receiver handle 10 when the receiver door 7 is opened. The lower end of a pivot shaft 52, which serves as an axis for opening the receiver door 7, includes a connection piece 52a that pivots integrally with the pivot shaft 52. The connection piece 52a pivotally supports a plate-shaped arm 53, which has an elongated hole 57. The frame 39 includes a pivot piece 55, which is pivotal about a pivot shaft 54 extending in a heightwise direction (Z-axis direction in FIG. 6). A projection 56 projects from the rear surface of the pivot piece 55. The projection 56 is inserted into the elongated hole 57 of the arm 53. The receiver handle lock mechanism 51 is one example of an operation lock mechanism.

Figure 7A:
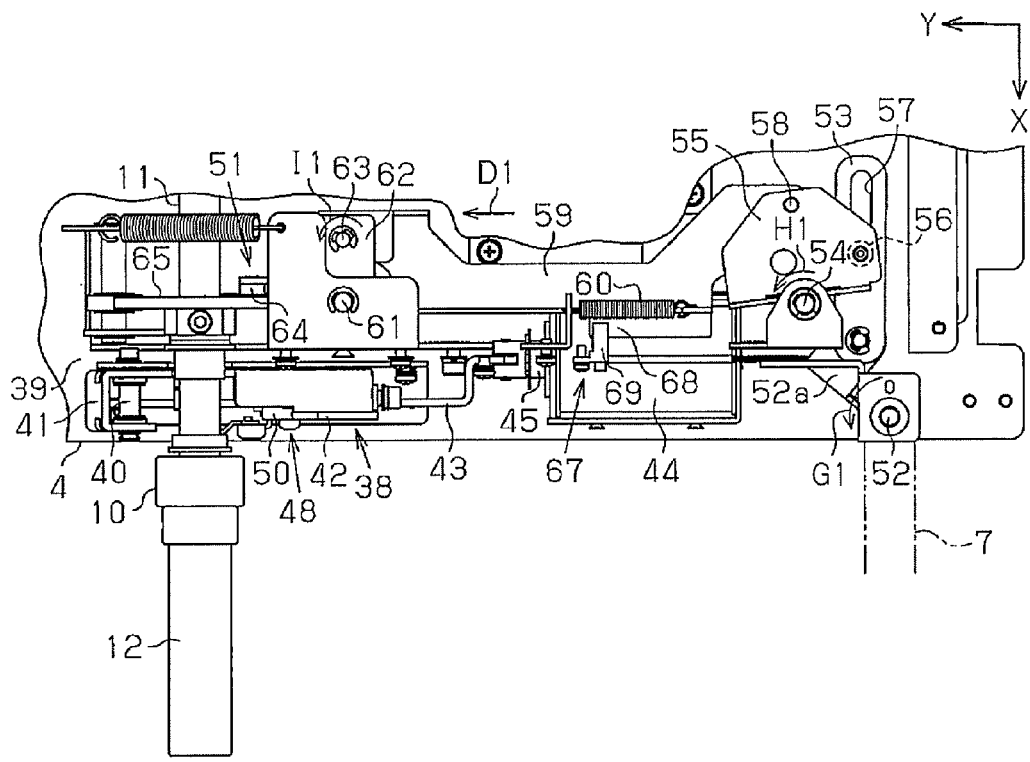
FIG. 7A is a plan view showing an operating state of the receiver handle lock mechanism when the safe is locked.
Figure 7B:
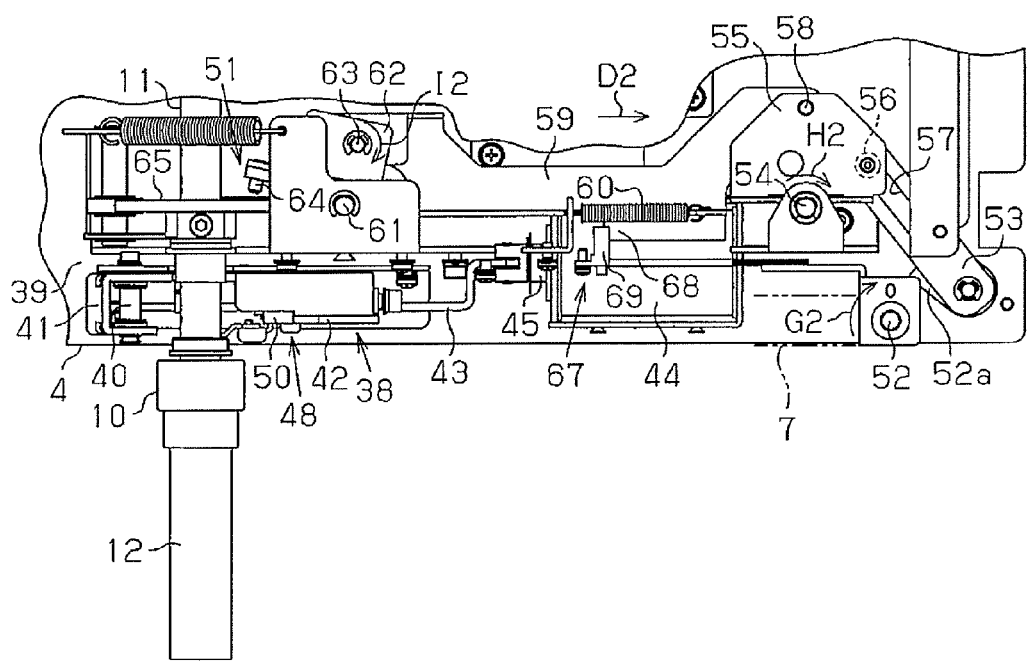
FIG. 7B is a plan view showing an operating state of the receiver handle lock mechanism when the safe is unlocked.

As shown in FIGS. 6, 7A and 7B, an end of an elongated connection portion 59 is pivotally supported by a pivot shaft 58, which is arranged on the pivot piece 55 at the opposite side of the projection 56. A biasing portion 60 is located between the connection portion 59 and the frame 39. The biasing portion 60 biases the connection portion 59 in a locking direction (direction of arrow D1 in FIG. 6). The frame 39 pivotally supports a pivot piece 62, which is pivotal around a shaft portion 61 extending in a heightwise direction. The pivot piece 62 pivotally supports a distal end of the connection portion 59 around a shaft 63 extending in a heightwise direction. A pin-shaped stopper 64, which is substantially cylindrical, for example, projects from a distal end of the pivot piece 62. The stopper 64 is one example of a projection of an operation lock mechanism.

A holed restriction plate 65, which is disk-shaped, for example, is arranged on the handle shaft 11 of the receiver handle 10. A plurality of circular holes 66 are arranged on the holed restriction plate 65 at regular intervals in a circumferential direction. When the receiver door 7 is closed, the stopper 64 is engaged with one of the holes 66 of the holed restriction plate 65 so that the receiver handle lock mechanism 51 locks the receiver handle 10. The hole 66 is one example of a receptor.

The receiver 4 includes a receiver door opening detection sensor 67, which detects the opening and closing of the receiver door 7. The receiver door opening detection sensor 67 includes, for example, a photocoupler. The receiver door opening detection sensor 67 includes a light-blocking plate 68, which is arranged on the side wall of the connection portion 59, and a sensor 69 that detects whether or not the light-blocking plate 68 is blocking light. When the receiver door 7 is closed to lock the receiver handle lock mechanism 51, the light-blocking plate 68 blocks the light of the sensor 69. This activates the receiver door opening detection sensor 67.

Figure 8:
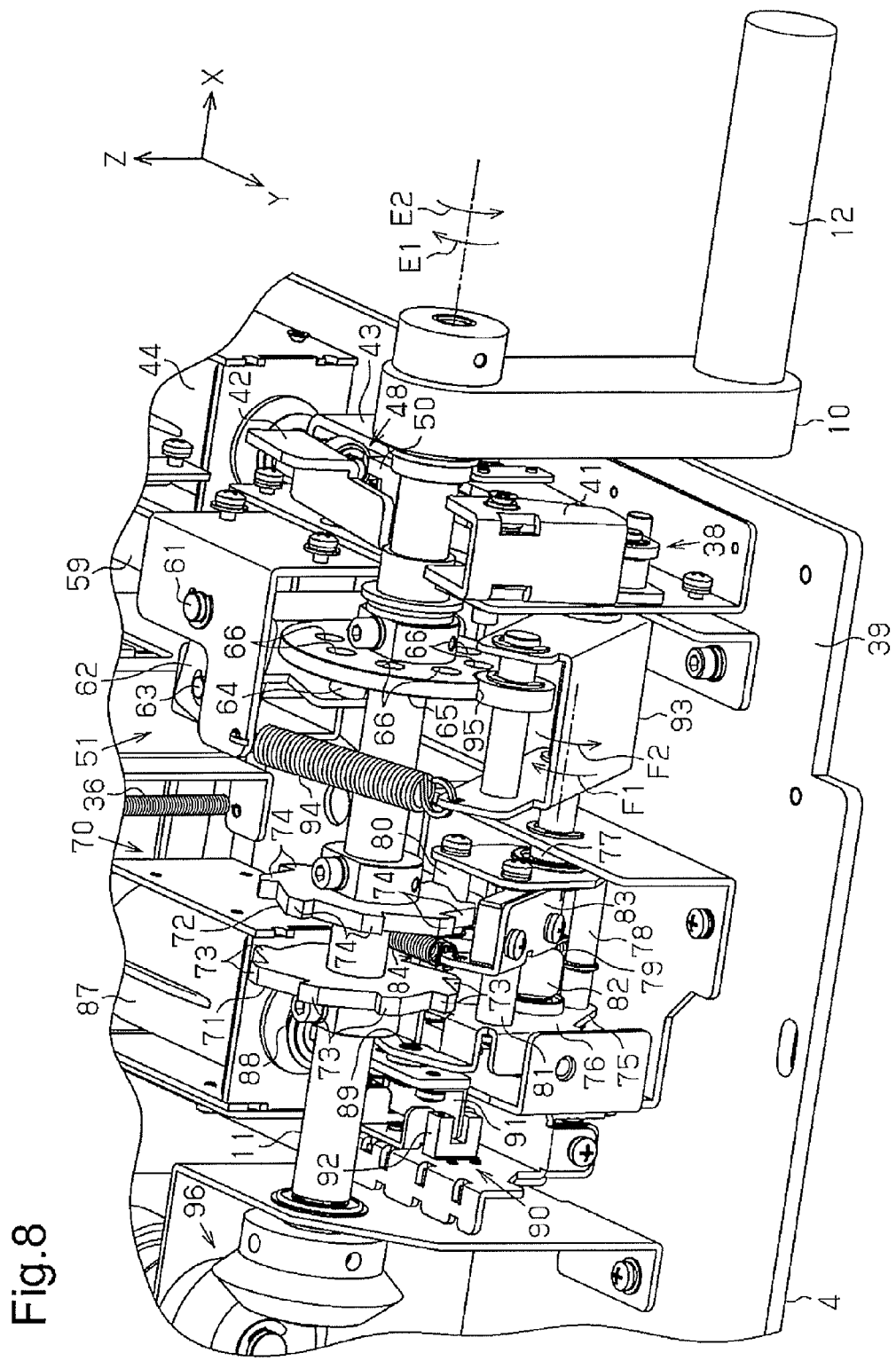
FIG. 8 is a perspective view showing the structure of a receiver handle operation direction switching mechanism.

As shown in FIG. 8, the receiver 4 includes a receiver handle operation direction switching mechanism 70, which allows rotation of the receiver handle 10 in a single direction, forward rotation or reverse rotation. A forward rotation restriction gear 71, which restricts forward rotation (direction of arrow E1 in FIG. 8) of the receiver handle 10, and a reverse rotation restriction gear 72, which restricts reverse rotation (direction of arrow E2 in FIG. 8) of the receiver handle 10, are attached near the middle of the handle shaft 11 of the receiver handle 10. A plurality of projections 73 are arranged on the outer circumference of the forward rotation restriction gear 71 at regular intervals in the circumferential direction. The plurality of projections 73 disable forward rotation of the forward rotation restriction gear 71 and enable reverse rotation of the forward rotation restriction gear 71. Each projection 73 of the forward rotation restriction gear 71 is curved in shape and has a surface that descends in the reverse direction. A plurality of projections 74 are arranged on the outer circumference of the reverse rotation restriction gear 72 at regular intervals in a circumferential direction. The plurality of projections 74 disable reverse rotation of the reverse rotation restriction gear 72 and enable forward rotation of the reverse rotation restriction gear 72. Each projection 74 of the reverse rotation restriction gear 72 is curved in shape and has a surface that descends in the forward direction. The forward rotation restriction gear 71 and the reverse rotation restriction gear 72 are coaxial.

Figure 9A:
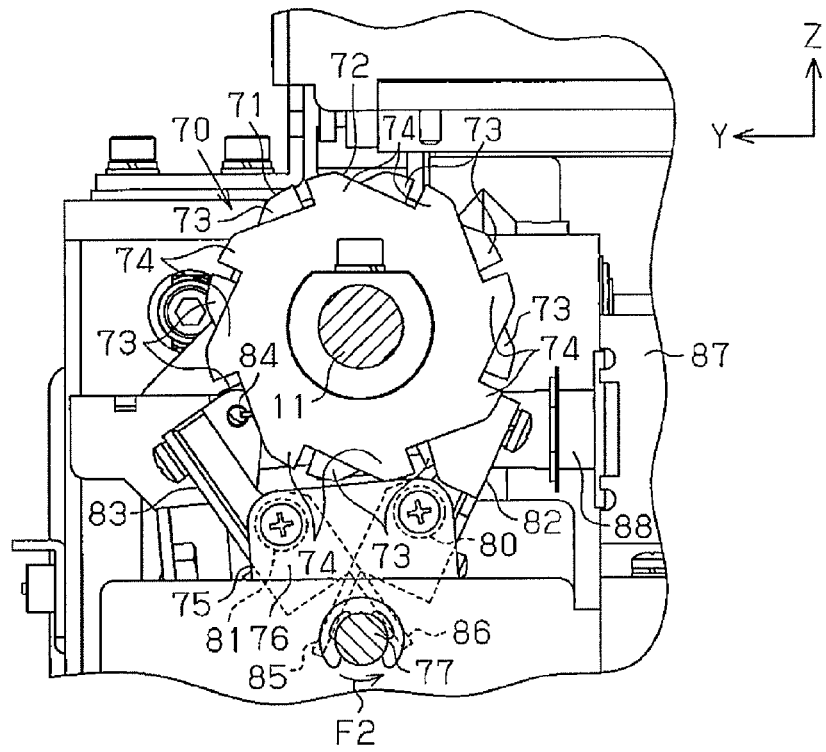
FIG. 9A is a front view showing an operating state of the receiver handle operation direction switching mechanism when reverse rotation of the receiver handle is allowed.
Figure 9B:
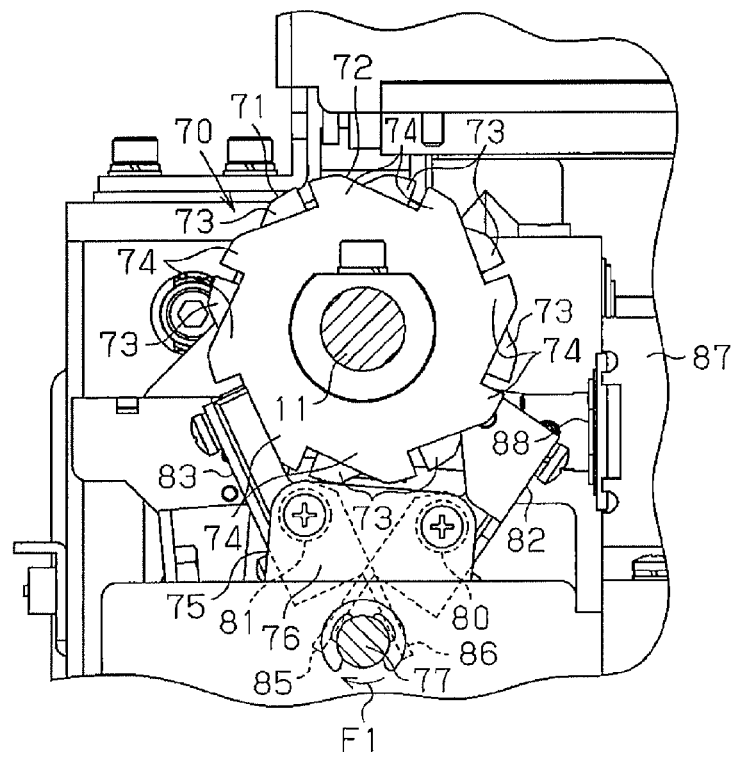
FIG. 9B is a front view showing an operating state of the receiver handle operation direction switching mechanism when forward rotation of the receiver handle is allowed.

As shown in FIGS. 8, 9A and 9B, a gear rotation restricting unit 75 is located below the forward rotation restriction gear 71 and the reverse rotation restriction gear 72 of the frame 39. The gear rotation restricting unit 75 allows rotation of only one of the forward rotation restriction gear 71 and the reverse rotation restriction gear 72. A frame 76 of the gear rotation restricting unit 75 includes a pivot shaft 77 extending in the rearward direction (X-axis direction in FIG. 8). The pivot shaft 77 is pivotally supported by the frame 39. Thus, the gear rotation restricting unit 75 is pivotal about the pivot shaft 77. A connection shaft 78 is located at the lower side of the gear rotation restricting unit 75. The connection shaft 78 includes a biasing portion 79, which biases the gear rotation restricting unit 75 so that the gear rotation restricting unit 75 pivots in the reverse direction (direction of arrow F2 in FIG. 8) around the pivot shaft 77.

As shown in FIGS. 9A and 9B, two shafts 80 and 81 extending in the rearward direction are arranged in the upper portion of the gear rotation restricting unit 75. A restriction block 82, which is pivotal around the shaft 80, is coupled to the shaft 80. The restriction block 82 is engageable with the projection 73 of the forward rotation restriction gear 71. A restriction block 83, which is pivotal around the shaft 81, is coupled to the shaft 81. The restriction block 83 is engageable with the projection 74 of the reverse rotation restriction gear 72. A biasing portion 84, which biases the two restriction blocks 82 and 83, is located between the restriction blocks 82 and 83 so that the two restriction blocks 82 and 83 move toward each other. A projection piece 85, which is located on an end of the restriction block 82, contacts the pivot shaft 77 and positions the restriction block 82 relative to the forward rotation restriction gear 71. A projection piece 86, which is located on an end of the restriction block 83, contacts the pivot shaft 77 and positions the restriction block 83 relative to the reverse rotation restriction gear 72.

As shown in FIG. 8, a solenoid 87 is connected to and located next to the gear rotation restricting unit 75 on the frame 39. The solenoid 87 serves as a drive source when rotating the gear rotation restricting unit 75 in the forward direction (direction of arrow F1 in FIG. 8) around the pivot shaft 77. The solenoid 87 includes, for example, a retractable solenoid. A plunger 88 is pivotally connected to the upper portion of the gear rotation restricting unit 75 by the pivot shaft 89.

Activation of the solenoid 87 selectively actuates the set of the forward rotation restriction gear 71 and the restriction block 82 and the set of the reverse rotation restriction gear 72 and the restriction block 83. The receiver handle operation direction switching mechanism 70 is in a reverse operation permitting condition when the set of the forward rotation restriction gear 71 and the restriction block 82 is actuated. The receiver handle operation direction switching mechanism 70 is in a forward operation permitting condition when the set of the reverse rotation restriction gear 72 and the restriction block 83 is actuated. The forward operation permitting condition is one example of a first movement permitting condition and the reverse operation permitting condition is one example of a second movement permitting condition.

The receiver handle operation direction switching mechanism 70 includes a receiver handle operation direction detection sensor 90, which detects whether the receiver handle 10 is set to rotate in the forward direction or the reverse direction. The receiver handle operation direction detection sensor 90 includes, for example, a photocoupler. The receiver handle operation direction detection sensor 90 includes a light-blocking plate 91, which is located on a distal end of the plunger 88 in the solenoid 87, and a sensor 92 that detects whether or not the blocking plate 91 is blocking light. If the solenoid 87 is activated to retract the plunger 88, the light-blocking plate 91 is separated from the sensor 92. This deactivates the receiver handle operation direction detection sensor 90.

The frame 39 includes a clicking unit 93 that produces clicks at the home position of the receiver handle 10. The clicking unit 93 includes a lower end pivotally supported by the pivot shaft 77 and an upper end connected to a biasing portion 94. When the receiver handle 10 is rotated near the home position, the clicking unit 93 is rotated by the biasing force of the biasing portion 94 to fall into a notch groove 95, which is recessed in the side of the holed restriction plate 65. This pulls the receiver handle 10 to the home position.

Figure 10:
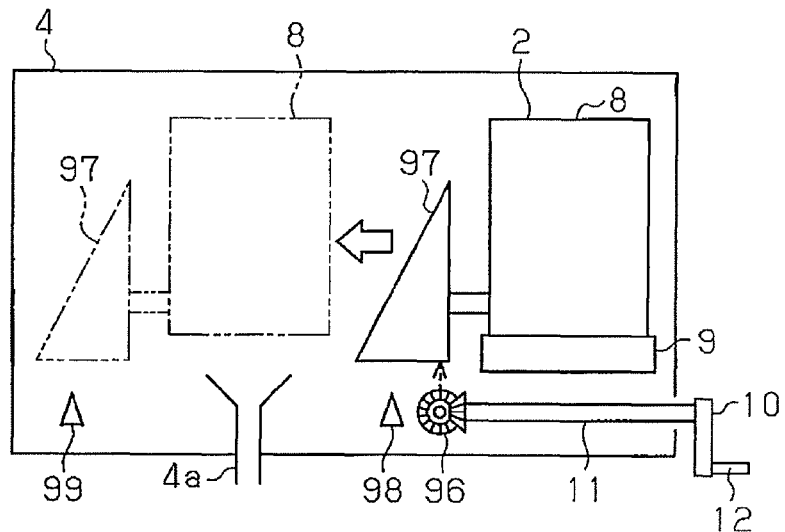
FIG. 10 is a schematic diagram showing a home position and a retraction position of a safe body.

As shown in FIG. 10, an end of the receiver handle 10 is connected to a back surface movable portion 97 by a gear mechanism 96 of, for example, a bevel gear. When the receiver handle 10 undergoes a single rotation in the forward direction, the rotation force moves the back surface movable portion 97 toward the inner side together with the safe body 8, which is held on the back surface movable portion 97. When the receiver handle 10 undergoes a single rotation in the reverse direction, the rotation force moves the back surface movable portion 97 to the front side together with the safe body 8, which is held on the back surface movable portion 97. That is, the safe body 8 moves between the home position where the opening of the safe body 8 is closed and the retraction position where the safe lid 9 opens the opening of the safe body 8.

The receiver 4 includes a home position detection sensor 98 and a retraction position detection sensor 99, which are arranged on a side portion of the receiver 4. The home position detection sensor 98 detects that the safe body 8 is located at the home position. The retraction position detection sensor 99 detects that the safe body 8 is located at the retraction position. Two chutes 4a that guide, to the cabinet 3, collected items falling out of the safe body 8 are arranged at the bottom of the receiver 4, which faces the safe body 8 at the retraction position. The home position detection sensor 98 and the retraction position detection sensor 99 each include a photocoupler. The home position is one example of a first position and the retraction position is one example of a second position.

Figure 11:
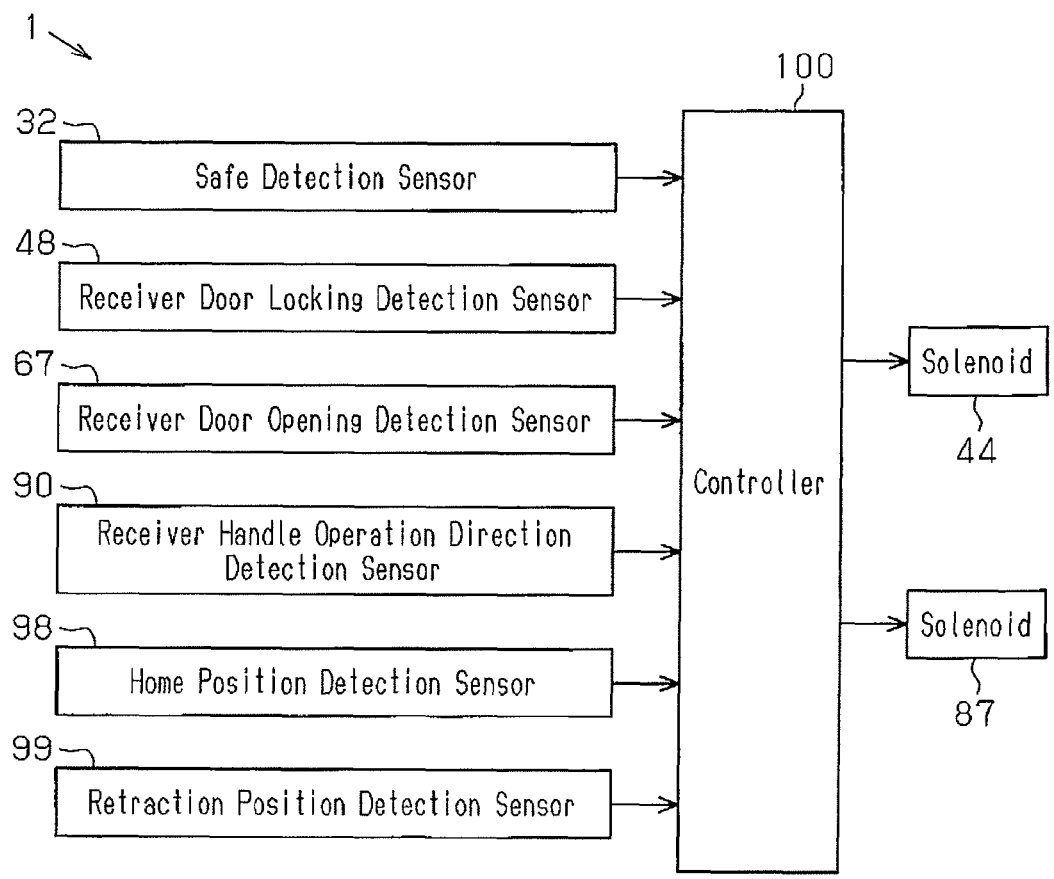
FIG. 11 is a diagram showing the electric configuration of the safe unlocking machine.

As shown in FIG. 11, the safe unlocking machine 1 includes a controller 100, which controls the operation of the safe unlocking machine 1. The safe detection sensor 32, the receiver door locking detection sensor 48, the receiver door opening detection sensor 67, the receiver handle operation direction detection sensor 90, the home position detection sensor 98, and the retraction position detection sensor 99 are connected to an input side of the controller 100. The two solenoids 44 and 87 are connected to an output side of the controller 100. The solenoids 44 and 87 are controlled in accordance with the output from the sensors 32, 48, 67, 90, 98, and 99 to perform an item collecting operation from the safe 2. The controller 100 is one example of a switch controller.

Next, the operation of the safe unlocking machine 1 in this example will be described with reference to FIGS. 5, 7 to 10, and 12.

Figure 12A:
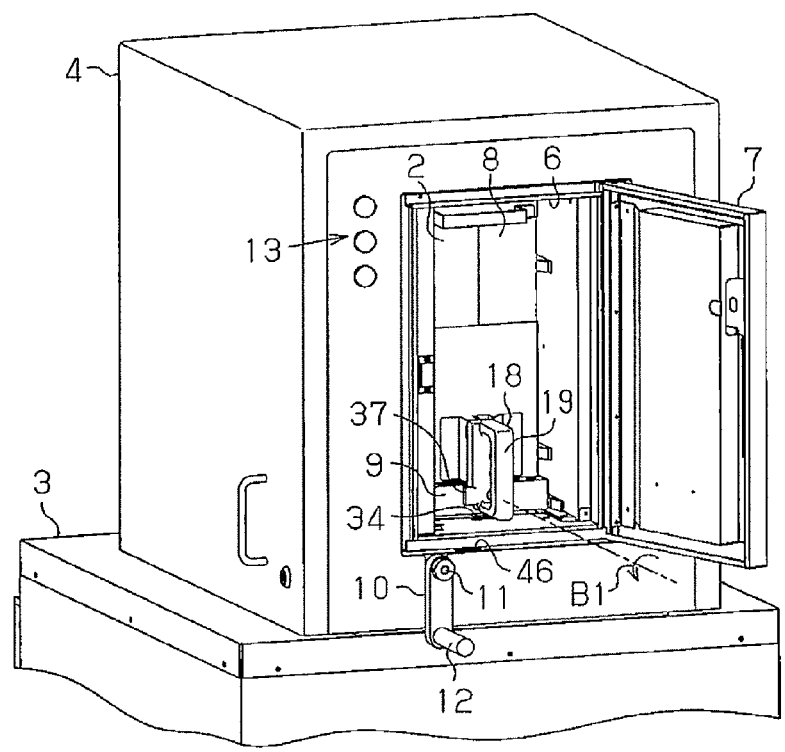
FIG. 12A is a perspective view of a safe handle in a vertical position.

Referring to FIG. 12A, when collecting items from the safe 2 with the safe unlocking machine 1, the safe 2 is set upside down in the safe accommodation portion 6. When the safe 2 is fitted into the safe accommodation portion 6, the key plate 24, which is arranged in the safe accommodation portion 6, is inserted into the cylinder lock 23, which is arranged in the rear surface of the safe body 8. This unlocks the safe 2 and allows rotation of the safe handle 18.

Figure 12B:
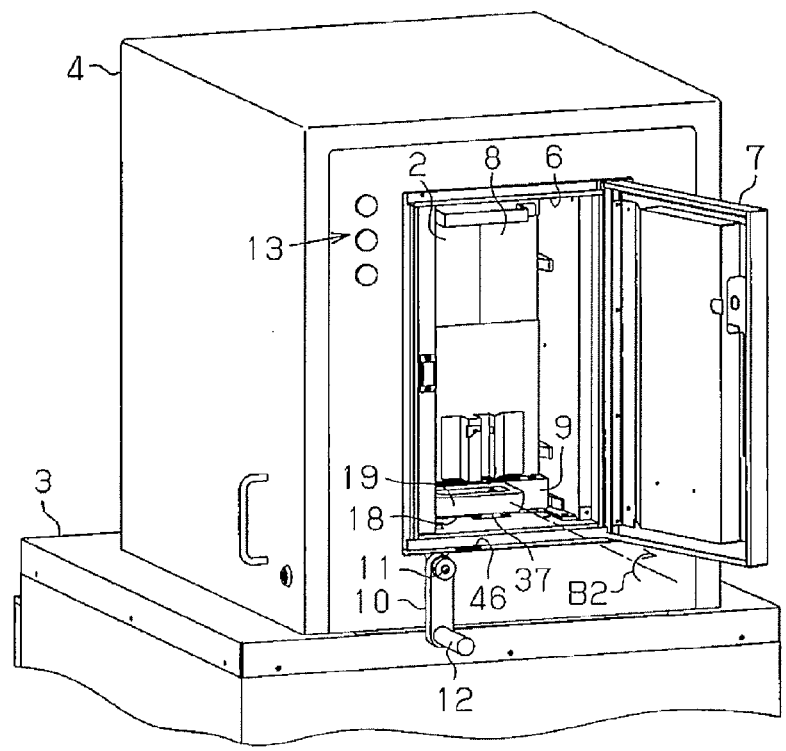
FIG. 12B is a perspective view of the safe handle in a horizontal position.

Referring to FIG. 12B, when the safe 2 is set in the safe accommodation portion 6, the safe handle 18 arranged at the vertical position is pivoted around the shaft 20 by approximately 90 degrees in the downward direction (direction of arrow B1 in FIG. 12A). This moves the safe handle 18 to the horizontal position. The projection 37 of the safe handle 18 pushes the lever 34 and pivots the lever 34 in the opening direction against the biasing force of the biasing portion 36. This activates the safe detection sensor 32 and supplies an activation signal to the controller 100.

Referring to FIG. 7A, when the receiver door 7 is open, the connection piece 52a is pivoted in the opening direction (direction of arrow G1 in FIG. 7A). Thus, the arm 53 is located toward the left on the plane of the drawing, and the pivot piece 55 is pivoted about the pivot shaft 54 in a locking direction (direction of arrow H1 in FIG. 7A). This moves the connection portion 59 in the locking direction (direction of arrow D1 in FIG. 7A) with the biasing force of the biasing portion 60 so that the distal end of the connection portion 59 pushes the pivot piece 62 and the pivot piece 62 pivots about the shaft 63 in the locking direction (direction of arrow I1 in FIG. 7A). As a result, engagement of the stopper 64 with one of the holes 66 of the holed restriction plate 65 disables rotation of the receiver handle 10 when the receiver 7 is open.

Referring to FIG. 7B, when closing the receiver door 7 after pivoting the safe handle 18 to the horizontal position, the connection piece 52a is pivoted in the closing direction (direction of arrow G2 in FIG. 7B). This inclines the arm 53 as the arm 53 moves toward the inner side. The pivot piece 55 pivots about the pivot shaft 54 in the unlocking direction (direction of arrow H2 in FIG. 7B) against the biasing force of the biasing portion 60, and the connection portion 59 moves in the unlocking direction (direction of arrow D2 in FIG. 7B). This pivots the pivot piece 62 about the shaft 63 in the unlocking direction (direction of arrow 12 in FIG. 7B) and disengages the stopper 64 from the hole 66 of the holed restriction plate 65. Thus, the receiver handle 10 is shifted to a free state to allow rotation of the receiver handle 10. When the receiver door 7 is closed, the light-blocking plate 68 of the receiver door opening detection sensor 67 is separated from the sensor 69. This deactivates the receiver door opening detection sensor 67 and supplies a deactivation signal to the controller 100.

Referring to FIG. 5B, when receiving an activation signal from the safe detection sensor 32 and a deactivation signal from the receiver door opening detection sensor 67, the controller 100 activates the solenoid 44 and retracts the plunger 45. This moves the connection portion 43 in the locking direction (direction of arrow J1 in FIG. 5B) and pivots the lever 41 in the locking direction (direction of arrow C1 in FIG. 5B). The projection 42 on the distal end of the lever 41 projects out of the slit 46 and engages the receiver door 7 to lock the receiver door 7 when closed. When the lever 41 is pivoted in the locking direction, the light-blocking plate 49 of the receiver door locking detection sensor 48 blocks the light to the sensor 50. This activates the receiver door locking detection sensor 48 and supplies an activation signal to the controller 100.

Referring to FIG. 9B, the controller 100 activates the solenoid 87 and retracts the plunger 88 when acknowledging that the safe 2 is set in the safe accommodation portion 6 from an activation signal of the safe detection sensor 32 and while acknowledging that the receiver door 7 has been locked from an activation signal of the receiver door locking detection sensor 48. Here, the gear rotation restricting unit 75 rotates in the forward direction (direction of arrow F1 in FIG. 9B) around the pivot shaft 77. This separates the restriction block 82 from the forward rotation restriction gear 71 and engages the restriction block 83 with the projection 74 of the reverse rotation restriction gear 72. Thus, the forward rotation restriction gear 71 becomes free and the reverse rotation restriction gear 72 is actuated. When the solenoid 87 is activated, the receiver handle 10 is rotatable only in the forward direction (forward rotation permitting condition). When the receiver handle 10 is rotated in the forward direction, the biasing portion 84 expands and pivots the restriction block 83 around the shaft 81. This allows forward rotation of the receiver handle 10.

Referring to FIG. 10, when the solenoid 87 is activated, a single rotation of the receiver handle 10 in the forward direction moves the safe body 8 from the home position to the retraction position. When the safe body 8 moves to the retraction position, the items in the safe body 8 fall through the chute 4a into the cabinet 3. That is, items in the safe body 8 are collected in the cabinet 3 at a single location.

Referring to FIGS. 8 and 9A, when acknowledging that the safe body 8 has reached the retraction position based on an activation signal from the retraction position detection sensor 99, the controller 100 deactivates the solenoid 87 and pivots the gear rotation restricting unit 75 around the pivot shaft 77 in the reverse direction (direction of arrow F2 in FIG. 9A). This engages the restriction block 82 with the projection 73 of the forward rotation restriction gear 71 and separates the restriction block 83 from the reverse rotation restriction gear 72. Thus, the forward rotation restriction gear 71 is actuated and the reverse rotation restriction gear 72 becomes free. When the solenoid 87 is deactivated, the receiver handle 10 is rotatable only in the reverse direction (reverse rotation permitting condition). When the receiver handle 10 is rotated in the reverse direction, the biasing portion 84 expands and pivots the restriction block 82 around the shaft 80. This allows reverse rotation of the receiver handle 10.

When the solenoid 87 is deactivated, a single rotation of the receiver handle 10 in the reverse direction moves the safe body 8 from the retraction position to the home position. When the safe body 8 is located at the home position, the safe lid 9 closes the opening of the safe body 8.

Referring to FIG. 5A, the controller 100 acknowledges that the safe body 8 has returned to the home position when receiving an activation signal of the home position detection sensor 98. At this moment or after a certain time, the controller 100 deactivates the solenoid 44 and moves the connection portion 43 in the unlocking direction (direction of arrow J2 in FIG. 5A). The lever 41 pivots in the unlocking direction (direction of arrow C2 in FIG. 5A) and the projection 42 moves away from the receiver door 7. This unlocks the receiver door 7 and allows opening of the receiver door 7.

Referring to FIG. 7A, when opening the receiver door 7 after unlocking the receiver door 7, the connection piece 52a is pivoted in the opening direction (direction of arrow G1 in FIG. 7A). This moves the arm 53 toward the left on the plane of the drawing. As a result, the biasing force of the biasing portion 60 pivots the pivot piece 55 about the pivot shaft 54 in the locking direction (direction of arrow H1 in FIG. 7B) and moves the connection portion 59 in the locking direction (direction of arrow D1 in FIG. 7B). This pivots the pivot piece 62 about the shaft portion 61 in the locking direction (direction of arrow I1 in FIG. 7B), and the stopper 64 engages with the hole 66 of the holed restriction plate 65. Thus, the receiver handle 10 is shifted to a locking state to disable rotation of the receiver handle 10. The stopper 64 and the hole 66 may be misaligned when the receiver door 7 is open. In such a case, the elongated hole 57 of the arm 53 moves away the projection 56. This protects the components 55, 59, 63, and the like. When the receiver door 7 is open, the receiver door opening detection sensor 67 is deactivated.

Subsequently, as shown in FIGS. 12A and 12B, the safe handle 18 is pivoted from the horizontal position around the handle shaft 11 by approximately 90 degrees in the upward direction (direction of arrow B2 in FIG. 12B) to remove the safe 2 from the safe unlocking machine 1. The safe 2 removed from the safe unlocking machine 1 is set again to the original farebox.

The above collecting operation is performed for each safe 2 to collect items from the safe 2 at the same location. The coins in the cabinet 3 are discharged from the discharge door 14 to the outside of the safe unlocking machine 1. Bills and the like in the cabinet 3 are removed from the cabinet 3 by opening the rear door 15 and drawing out the container 17.

The safe unlocking machine 1 may have a retry function implemented to retry operation when the safe body 8 is caught and stopped, for example, as the safe body 8 returns from the retraction position to the home position or as the safe body 8 moves from the home position to the retraction position. The retry function automatically starts based on, for example, the outputs of the home position detection sensor 98 and the retraction position detection sensor 99, if the safe body 8 does not reach a target position within a certain time. Alternatively, the retry function is implemented when an operation unit of the controller 100 is operated.

For example, if items do not fall from the safe body 8 in a desired manner and the safe body 8 thereby becomes caught as the safe body 8 moves and returns from the retraction position to the home position, the solenoid 87 is activated again to shift the receiver handle 10 to a forward rotation permitting condition. As a result, the receiver handle 10 may be rotated again in the forward direction to return the safe body 8 to the retraction position and drop the caught items.

If something is caught by the safe body 8 thereby stopping movement of the safe body 8 as the safe body 8 moves from the home position to the retraction position, the solenoid 87 is deactivated again to shift the receiver handle 10 to a reverse rotation permitting condition. As a result, the receiver handle 10 may be rotated again in the reverse direction to return the safe body 8 to the home position and free the safe body 8.

The present embodiment has the advantages described below.

(1) A single rotation of the receiver handle 10 in the forward direction moves the safe body 8 from the home position to the retraction position. This sets the safe body 8 in the safe unlocking machine 1 and discharges items out of the safe body 8 and into the safe unlocking machine 1. A single rotation of the receiver handle 10 in the reverse direction returns the safe body 8 from the retraction position to the original home position. When moving the safe body 8 from the home position to the retraction position and when returning the safe body 8 from the retraction position to the home position, the same receiver handle 10 is used to operate the safe unlocking machine 1. This eliminates the need to provide the safe unlocking machine 1 with a mechanism for, for example, automatically returning the safe body 8 from the retraction position to the home position. Thus, the safe unlocking machine 1 allows for a simplified structure.

(2) The mechanism for moving the safe body 8 to the retraction position or the home position is a manual mechanism that uses the receiver handle 10. The receiver handle 10 is directly operated to return the safe body 8 from the retraction position to the home position. This ensures the reliability of the returning operation when returning the safe body 8 to the home position. When the receiver handle 10 is rotated in the reverse direction to return the safe body 8 from the retraction position to the home position, the operation load on the receiver handle 10 derives only from the weight of the safe body 8. This enables the receiver handle 10 to be operated relatively easily. Thus, the operability of the receiver handle 10 is ensured.

(3) When the safe body 8 set in the safe unlocking machine 1 is moved from the home position to the retraction position, the receiver handle 10 is rotatable only in the forward direction. When the safe body 8 set in the safe unlocking machine 1 is returned from the retraction position to the home position, the receiver handle 10 is rotatable only in the reverse direction. Thus, an operator can immediately recognize the correct direction for operating the receiver handle 10. In addition, operation errors of the receiver handle 10 are less likely to occur.

(4) When the receiver door 7 is closed and locked after setting the safe 2 in the safe unlocking machine 1, the solenoid 87 is activated. This allows the receiver handle 10 to be rotated in the forward direction. Thus, the receiver handle 10 is rotatable in the forward direction at a preferable timing, which is when the safe 2 is set in the safe accommodation portion 6 and the receiver door 7 is locked.

(5) When the receiver door 7 is opened, the stopper 64 engages with the hole 66 of the holed restriction plate 65. This disables rotation of the receiver handle 10. Thus, when the receiver door 7 is opened, the receiver handle 10 is not rotated in an unnecessary manner.

(6) The receiver handle operation direction detection sensor 90, which detects a drive condition of the solenoid 87, recognizes whether the receiver handle operation direction switching mechanism 70 is rotatable in the forward direction or in the reverse direction.

(7) The safe unlocking machine includes the retry function. Thus, even if the safe body 8 moved by the receiver 10 becomes caught and is stopped, the safe body 8 may be released by the retry function.

The embodiment is not limited to the foregoing structure. It should be understood that the embodiment may be implemented in the following forms.

The condition for activating the solenoid 87 of the receiver handle operation direction switching mechanism 70 is not limited to the receiver door 7 being closed and locked. This condition can be changed to another condition such as the receiver door 7 just being closed. Similarly, the condition for deactivating the solenoid 87 can be changed to another condition. The condition for operating the receiver door lock mechanism 38 may also be changed.

The first position is not limited to the home position. The first position may be a position where the safe body 8 is arranged before the safe lid 9 is opened. The second position is not limited to the retraction position. The second position may be a position where the safe lid 9 is opened.

The first operation permitting condition is not limited to a forward rotation operation permitting condition. The first operation permitting condition may be a condition where the receiver handle 10 opens the safe body 8. The second operation permitting condition is not limited to a reverse rotation operation permitting condition. The second operation permitting condition may be a condition in which the receiver handle 10 closes the safe lid 9.

The receiver handle operation direction switching mechanism 70 may be changed to a structure other than that disclosed in the embodiment. For example, the drive source may be changed to a motor and the rotating member may be changed to a sliding member. The same is applied to the receiver door lock mechanism 38 and the receiver handle lock mechanism 51.

Each sensor can be changed to a different kind of sensors such as a magnetic sensor. Each sensor can also be changed to a mechanical switch such as a micro switch.

The invention claimed is:

1. A safe unlocking machine that collects items accommodated in a safe body of a safe by setting the safe, unlocking the safe, and opening a lid of the safe, wherein the safe unlocking machine moves the safe body of the safe between a first position where the lid closes the safe and a second position where the lid opens the safe, the safe unlocking machine comprises:
    an operation unit operable to move in a first direction when moving the safe body from the first position to the second position and to move in a second direction, which is opposite to the first direction, when moving the safe body from the second position to the first position;
    an operation direction switching mechanism that selectively switches to a first movement permitting condition in which movement of the operation unit is permitted only in the first direction and a second movement permitting condition in which movement of the operation unit is permitted only in the second direction;
    a detector that detects operation of the safe unlocking machine and generates a detection signal; and
    a switch controller that controls the operation direction switching mechanism based on the detection signal from the detector to selectively set a movement direction of the operation unit to the first direction and the second direction.

2. The safe unlocking machine according to claim 1, comprising a safe accommodation portion capable of setting the safe and including a door, wherein
    the switch controller sets the operation direction switching mechanism to the first movement permitting condition, when the safe is set in the safe accommodation portion and the door of the safe accommodation portion is closed and locked, and
    the switch controller sets the operation direction switching mechanism to the second movement permitting condition, when the safe body of the safe set in the safe accommodation portion moves from the first position to the second position.

3. The safe unlocking machine according to claim 2, comprising an operation unit lock mechanism that includes a projection that moves in cooperation with the door and a receptacle that moves in cooperation with the operation unit, wherein
    the operation unit lock mechanism restricts movement of the operation unit when the door of the safe accommodation portion is open and the projection is engaged with the receptacle, and
    the operation unit lock mechanism allows movement of the operation unit by closing the door of the safe accommodation portion to separate the projection from the receptacle.

4. The safe unlocking machine according to claim 1, wherein
    the switch controller switches the operation direction switching mechanism from the first movement permitting condition to the second movement permitting condition when the safe body does not move from the first position to the second position within a predetermine time, and
    the switch controller switches the operation direction switching mechanism from the second movement permitting condition to the first movement permitting condition when the safe body does not move from the second position to the first position within a predetermined time.

5. The safe unlocking machine according to claim 4, comprising:
    a first detection sensor that detects when the safe body is located at the first position and supplies a first timing detection signal to the switch controller; and
    a second detection sensor that detects when the safe body is located at the second position and supplies a second timing detection signal to the switch controller,
    wherein the switch controller determines whether the safe body has moved between the first position and the second position within a predetermined time based on the first timing detection signal and the second timing detection signal.

6. The safe unlocking machine according to claim 5,
    wherein when the operation unit does not receive the second timing detection signal before a predetermined time elapses from when the operation unit moves in the first direction, the switch controller determines that the safe body has not moved from the first position to the second position within the predetermined time and switches the operation direction switching mechanism from the first movement permitting condition to the second movement permitting condition,
    wherein when the operation unit does not receive the first timing detection signal before a predetermined time elapses from when the operation unit moves in the second direction, the switch controller determines that the safe body has not moved from the second position to the first position within the predetermined time and switches the operation direction switching mechanism from the second movement permitting condition to the first movement permitting condition.

* * * * *